(12) United States Patent
Fujimura et al.

(10) Patent No.: US 11,695,139 B2
(45) Date of Patent: Jul. 4, 2023

(54) FUEL CELL SYSTEM

(71) Applicants: TOYOTA JIDOSHA KABUSHIKI KAISHA, Toyota (JP); Aisan Kogyo Kabushiki Kaisha, Obu (JP)

(72) Inventors: Yoshikatsu Fujimura, Toyota (JP); Shinobu Otsuka, Tokai (JP); Jiro Oikawa, Tokai (JP)

(73) Assignees: TOYOTA JIDOSHA KABUSHIKI KAISHA, Toyota (JP); AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/495,877

(22) Filed: Oct. 7, 2021

(65) Prior Publication Data

US 2022/0123335 A1    Apr. 21, 2022

(30) Foreign Application Priority Data

Oct. 15, 2020  (JP) ............................. JP2020-173665

(51) Int. Cl.
*H01M 8/04664* (2016.01)
*H01M 8/04955* (2016.01)
(Continued)

(52) U.S. Cl.
CPC ... *H01M 8/04664* (2013.01); *H01M 8/04089* (2013.01); *H01M 8/04753* (2013.01); *H01M 8/04955* (2013.01); *H01M 2250/20* (2013.01)

(58) Field of Classification Search
CPC ......... H01M 8/04089; H01M 8/04097; H01M 8/04298; H01M 8/043; H01M 8/04313; H01M 8/04664; H01M 8/04671; H01M 8/04679; H01M 8/04686; H01M 8/04895; H01M 8/04951; H01M 8/04952;
(Continued)

(56) References Cited

U.S. PATENT DOCUMENTS

2010/0047663 A1* 2/2010 Manabe ............ H01M 8/04686
                                                429/414
2018/0026286 A1* 1/2018 Yamanaka ........ H01M 8/04559
                                                429/432
(Continued)

FOREIGN PATENT DOCUMENTS

JP    2008060054    *  3/2008
JP    2008060054 A      3/2008

*Primary Examiner* — Matthew W Van Oudenaren
(74) *Attorney, Agent, or Firm* — Dickinson Wright, PLLC (57) ABSTRACT

A fuel cell system includes: a fuel cell; a first valve device provided at an oxidation gas supply channel; a second valve device provided at an oxidation off-gas discharge channel; a third valve device provided at a bypass channel; an abnormality detection unit configured to detect an abnormality; and a control unit. The control unit causes the fuel cell to initiate fail-safe power generation if (i) a different abnormality from a valve opening abnormality is detected in the first valve device, (ii) the different abnormality is detected in the second valve device, or (iii) any abnormality is detected in the third valve device. During the fail-safe power generation, if any abnormality is additionally detected in any valve device different from the valve device in which an abnormality is already detected, the control unit stops power generation by the fuel cell.

4 Claims, 4 Drawing Sheets

(51) Int. Cl.
*H01M 8/04089* (2016.01)
*H01M 8/04746* (2016.01)

(58) Field of Classification Search
CPC ......... H01M 8/04753; H01M 8/04761; H01M 8/04395; H01M 8/0441; H01M 2250/20; H01M 8/04953; H01M 2250/10; H01M 2250/30
See application file for complete search history.

(56) References Cited

U.S. PATENT DOCUMENTS

2018/0166716 A1* 6/2018 Imanishi ........... H01M 8/04298
2019/0280314 A1* 9/2019 Katayama ......... H01M 8/04626

* cited by examiner

Fig.4

FUEL CELL SYSTEM

CROSS-REFERENCE TO RELATED APPLICATIONS

This application claims priority under 35 USC 119 to Japanese Patent Application No. 2020-173665 filed on Oct. 15, 2020, the entire disclosure of which is incorporated herein by reference.

BACKGROUND

Field

The present disclosure relates to a fuel cell system.

Related Art

A fuel cell system is known that includes an oxidation gas supply channel for supplying oxidation gas to a fuel cell, an oxidation off-gas discharge channel for discharging oxidation off-gas from the fuel cell, and a bypass channel connecting the oxidation gas supply channel and the oxidation off-gas discharge channel and bypassing the fuel cell. In one proposed configuration for such a fuel cell system, a fail-safe process is executed in the event of an abnormality occurring in a valve device (pressure control valve) disposed at the oxidation off-gas discharge channel (see Japanese Unexamined Patent Application Publication No. 2008-060054). The fail-safe process involves initiating a reduced-power operation of the fuel cell or adjusting an opening degree of a valve device provided at the bypass channel.

Besides a single abnormality in a valve device disposed at the oxidation off-gas discharge channel as contemplated in Japanese Unexamined Patent Application Publication No. 2008-060054, a fuel cell system may have a single abnormality in a valve device disposed at the oxidation gas supply channel or a single abnormality in a valve device disposed at the bypass channel. Moreover, multiple abnormalities may occur in any two or more of these three valve devices. Similarly to when a single abnormality occurs in the valve device disposed at the oxidation off-gas discharge channel, the occurrence of these other abnormalities may result in failures such as inability to continue power generation by the fuel cell or damages to components including an air compressor and pipes constituting the gas channel.

However, no sufficient consideration has been given to how to address an abnormality in the valve device disposed at the oxidation gas supply channel, an abnormality in the valve device disposed at the bypass channel, and multiple abnormalities occurring in any two or more of the above three valve devices.

SUMMARY

An aspect of the present disclosure is a fuel cell system. The fuel cell system includes: a fuel cell; an oxidation gas supply channel configured to supply oxidation gas to the fuel cell; an oxidation off-gas discharge channel configured to discharge oxidation off-gas from the fuel cell; a bypass channel configured to connect the oxidation gas supply channel and the oxidation off-gas discharge channel; a first valve device provided at the oxidation gas supply channel and configured to adjust a flow rate of the oxidation gas supplied to the fuel cell; a second valve device provided at the oxidation off-gas discharge channel and configured to adjust a flow rate of the oxidation off-gas discharged from the fuel cell; a third valve device provided at the bypass channel and configured to adjust a flow rate of the oxidation gas flowing through the bypass channel; an abnormality detection unit configured to detect an abnormality in the first valve device, the second valve device, and the third valve device; and a control unit configured to control power generation by the fuel cell. If (i) a different abnormality from a valve opening abnormality is detected in the first valve device, the valve opening abnormality being an abnormality where a valve is stuck at a minimum opening degree, (ii) the different abnormality is detected in the second valve device, or (iii) any abnormality is detected in the third valve device, the control unit causes the fuel cell to initiate fail-safe power generation in which a limitation is provided on an electric current output from the fuel cell. During the fail-safe power generation, if, among the first valve device, the second valve device, and the third valve device, any abnormality is additionally detected in one of two valve devices different from the other valve device in which an abnormality is already detected, the control unit stops power generation by the fuel cell.

DETAILED DESCRIPTION

A. First Embodiment

A1. System Configuration

Figure 1:
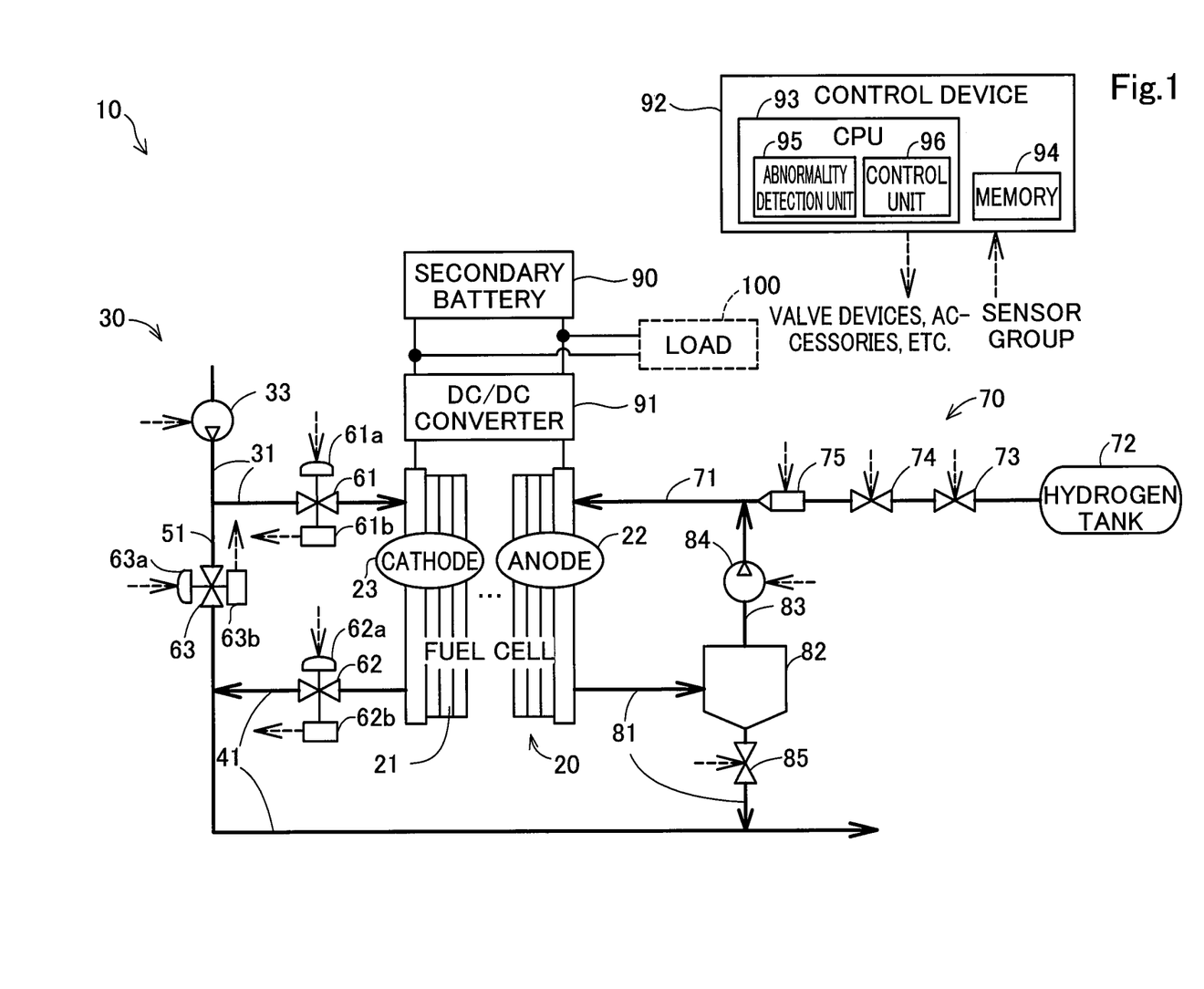
FIG. 1 is a block diagram of a configuration of a fuel cell system in one embodiment of the present disclosure.

FIG. 1 is a block diagram of a configuration of a fuel cell system 10 in one embodiment of the present disclosure. In the present embodiment, the fuel cell system 10 is mounted on a vehicle and supplies electric power to a load 100. The load 100 includes accessories such as an air compressor 33 and a hydrogen pump 84 (described later) included in the fuel cell system 10, as well as a traction motor (not shown).

The fuel cell system 10 includes a fuel cell 20, an oxidation gas supply/discharge system 30, a hydrogen gas supply/discharge system 70, a secondary battery 90, a DC/DC converter 91, and a control device 92.

In the present embodiment, the fuel cell 20 is a polymer electrolyte fuel cell that generates power by receiving hydrogen gas as anode reactant gas and air as oxidation gas (also referred to as cathode reactant gas). The fuel cell 20 is composed of a stack of multiple single cells 21. Thus, the fuel cell 20 is also referred to as a fuel cell stack. Each single cell 21 includes a membrane electrode assembly (not shown) having electrodes on both sides of an electrolyte membrane (not shown), and a pair of separators (not shown) sandwiching the membrane electrode assembly. Each single cell 21 constituting the fuel cell 20 is formed with an anode 22 and a cathode 23 with the electrolyte membrane interposed therebetween. Hydrogen gas is supplied to the anode 22, and air is supplied to the cathode 23. It should be noted that FIG. 1 conceptually illustrates the anode 22 and the cathode 23.

The oxidation gas supply/discharge system 30 supplies air to the fuel cell 20 and discharges oxidation off-gas (also referred to as cathode off-gas) from the fuel cell 20. The oxidation off-gas contains air that was not used in a power-generating electrochemical reaction in the fuel cell 20, and water vapor derived from water generated from such an electrochemical reaction.

The oxidation gas supply/discharge system 30 includes an oxidation gas supply channel 31, an air compressor 33, an oxidation off-gas discharge channel 41, a bypass channel 51, a first valve device 61, a second valve device 62, and a third valve device 63.

The oxidation gas supply channel 31 has its one end connected to the fuel cell 20 and is used to supply air (compressed air) to the fuel cell 20. The air compressor 33 is disposed at the oxidation gas supply channel 31 and takes in air from the atmosphere via a filter device (not shown) to compress and deliver it. The oxidation off-gas discharge channel 41 has its one end connected to the fuel cell 20 and is used to discharge oxidation off-gas from the fuel cell 20. The bypass channel 51 connects the oxidation gas supply channel 31 and the oxidation off-gas discharge channel 41. The bypass channel 51 is connected to a portion of the oxidation gas supply channel 31 downstream of the air compressor 33. The bypass channel 51 is also connected to the oxidation off-gas discharge channel 41. This allows air compressed by the air compressor 33 to bypass the fuel cell 20 to be supplied to the oxidation off-gas discharge channel 41.

The first valve device 61 is provided at the oxidation gas supply channel 31 to adjust a flow rate of air supplied to the fuel cell 20. The first valve device 61 includes a valve body (not shown), a first drive motor 61a for driving the valve body, and a first opening degree detection sensor 61b. In the present embodiment, the first valve device 61 is configured as a normally closed valve device. Thus, when no driving electric power is supplied to the first drive motor 61a, the oxidation gas supply channel 31 has a minimum opening degree of zero. It should be noted that the minimum opening degree is not limited to zero and may be any value larger than zero. The first opening degree detection sensor 61b detects the opening degree of the oxidation gas supply channel 31. For example, the first opening degree detection sensor 61b may detect the number of rotations of the first drive motor 61a with an encoder to thereby detect a drive amount of the valve body, i.e., the opening degree of the oxidation gas supply channel 31, based on the detected the number of rotations.

The second valve device 62 is provided at the oxidation off-gas discharge channel 41 to adjust a flow rate of oxidation off-gas discharged from the fuel cell 20. The second valve device 62 also serves as a pressure control valve that adjusts a cathode-side exhaust pressure by adjusting the flow rate of oxidation off-gas. The second valve device 62 has a similar configuration to the first valve device 61. That is, the second valve device 62 includes a valve body (not shown), a second drive motor 62a for driving the valve body, and a second opening degree detection sensor 62b, and is configured as a normally closed valve device.

The third valve device 63 is provided at the bypass channel 51 to adjust a flow rate of air (compressed air) flowing through the bypass channel 51. The third valve device 63 also adjusts a flow rate of air supplied to the fuel cell 20 by adjusting the flow rate of air flowing through the bypass channel 51. That is, the third valve device 63 splits the flow of compressed air supplied from the air compressor 33 into one going toward the fuel cell 20 and another one going toward the oxidation off-gas discharge channel 41, and adjusts a flow split ratio for such split. The third valve device 63 has a similar configuration to the first valve device 61 and the second valve device 62. That is, the third valve device 63 includes a valve body (not shown), a third drive motor 63a for driving the valve body, and a third opening degree detection sensor 63b, and is configured as a normally closed valve device.

The hydrogen gas supply/discharge system 70 supplies hydrogen gas to the fuel cell 20 and discharges anode off-gas from the fuel cell 20. The anode off-gas contains water vapor derived from water that passed through the electrolyte membrane from the cathode to the anode, as well as hydrogen gas that was not used in electrochemical reaction in the fuel cell 20, and the like.

The hydrogen gas supply/discharge system 70 includes a hydrogen gas supply channel 71, a hydrogen tank 72, a main stop valve device 73, a pressure control valve device 74, an injector 75, an anode off-gas discharge channel 81, a gas-liquid separator 82, a circulation channel 83, a hydrogen pump 84, and an exhaust drain valve device 85.

The hydrogen gas supply channel 71 is used to connect the hydrogen tank 72 and the fuel cell 20 to each other to supply hydrogen gas stored in the hydrogen tank 72 to the fuel cell 20. The hydrogen tank 72 stores high-pressure hydrogen gas. The main stop valve device 73 is located downstream of the hydrogen tank 72 and permits or stops the supply of hydrogen gas from the hydrogen tank 72. The pressure control valve device 74 is located downstream of the main stop valve device 73 and reduces pressure of hydrogen gas supplied from the hydrogen tank 72 before supplying it to the downstream side. The injector 75 is located downstream of the pressure control valve device 74 and injects hydrogen gas to the downstream side according to the control of the control device 92, more specifically according to injection cycles or injection time.

The anode off-gas discharge channel 81 has its one end connected to the fuel cell 20 and is used to discharge anode off-gas. The anode off-gas discharge channel 81 has its other end connected to the oxidation off-gas discharge channel 41. The gas-liquid separator 82 is provided at the anode off-gas discharge channel 81 and condenses water vapor, contained in the anode off-gas discharged from the fuel cell 20, into liquid water to thereby separate the anode off-gas into a gas component and liquid water. The gas component separated by the gas-liquid separator 82 is supplied to the circulation channel 83. On the other hand, the water separated as liquid water by the gas-liquid separator 82 accumulates on the bottom of the gas-liquid separator 82. Once the exhaust drain valve device 85 opens, the water is discharged from the gas-liquid separator 82 to flow into the oxidation off-gas discharge channel 41 via the exhaust drain valve device 85. The circulation channel 83 connects the anode off-gas discharge channel 81 and the hydrogen gas supply channel 71 to each other. The circulation channel 83 has its one end connected to a portion of the hydrogen gas supply channel 71 downstream of the injector 75. The gas component with the water vapor separated therefrom by the gas-liquid separator 82 contains a high proportion of hydrogen gas. Supplying (returning) such a gas component to the hydrogen gas supply channel 71 helps improve fuel efficiency. The hydrogen pump 84 is disposed at the circulation channel 83 and delivers the gas component discharged from the gas-liquid separator 82 to the hydrogen gas supply channel 71.

The secondary battery 90 is a chargeable/dischargeable battery. In the present embodiment, the secondary battery 90 is composed of a lithium-ion battery. It should be noted that the secondary battery 90 may be composed of any other secondary battery such as a nickel-metal hydride battery, instead of the lithium-ion battery. The secondary battery 90 supplies power to the load 100 in combination with or in place of the fuel cell 20, and is also configured to be capable of storing power generated by the fuel cell 20. The DC/DC converter 91 is disposed between the fuel cell 20 and the load 100 and between the fuel cell 20 and the secondary battery 90 and adjusts an output voltage from the fuel cell 20 before supplying it to the load 100 or the secondary battery 90. An inverter is provided between the DC/DC converter 91 and the traction motor (not shown) as the load 100, and a direct current is converted by the inverter into a three-phase alternating current before being supplied to the traction motor.

The control device 92 controls the entire fuel cell system 10. The control device 92 is configured as a computer including a CPU 93 and a memory 94. The CPU 93 executes control programs prestored in the memory 94 to implement functions as an abnormality detection unit 95 and a control unit 96.

The abnormality detection unit 95 detects an abnormality in the first valve device 61, the second valve device 62, and the third valve device 63. In the present embodiment, the abnormality detection unit 95 detects an abnormality in each of the valve devices 61, 62, 63 by comparing a drive command transmitted to each of the drive motors for driving the respective valve devices 61, 62, 63 and an opening degree detected by each of the opening degree detection sensors 61$b$, 62$b$, 63$b$. Specifically, for example if temporal changes of the opening degree detected by the first drive motor 61$a$ are zero (i.e., no changes occurred) despite a drive command to increase the opening degree being transmitted for the first valve device 61, the abnormality detection unit 95 detects an abnormality where the valve cannot be opened properly. Conversely, if temporal changes of the opening degree detected by the first drive motor 61$a$ are zero (i.e., no changes occurred) despite a drive command to reduce the opening degree being transmitted for the first valve device 61, the abnormality detection unit 95 detects an abnormality where the valve cannot be closed properly. Such an abnormality where the valve cannot be opened or closed may be caused by, for example, a foreign matter caught between gears connected to a drive motor shaft, rust on gears, or breakage of gear teeth. Such an abnormality may also be caused by a foreign matter caught between a shaft supporting the valve body and a bearing for the shaft. As described above, each of the valve devices 61, 62, 63 is a normally closed valve device. An abnormality where the valve of any of the valve devices 61, 62, 63 is stuck at the minimum opening degree, i.e., the zero opening degree in the present embodiment, and thus cannot be opened properly is herein referred to as a "valve opening abnormality".

The control unit 96 controls flow rates of air and hydrogen gas supplied to the fuel cell 20 to thereby control power generation by the fuel cell 20. Specifically, the control unit 96 controls the opening degree of each of the valve devices 61, 62, 63 and a rotation speed of the air compressor 33 to thereby control the flow rate of oxidation gas (air) supplied to the fuel cell 20. Additionally, the control unit 96 controls injection intervals or injection time of hydrogen gas injected by the injector 75 and a rotation speed of the hydrogen pump 84 to thereby control the flow rate of hydrogen gas supplied to the fuel cell 20. Based on information about a required amount of power received from an electric control unit (ECU) for driving control mounted on the vehicle, the control unit 96 calculates the flow rates of air and hydrogen gas to be supplied to the fuel cell 20 to cause it to output the required amount of power. To achieve these flow rates, the control unit 96 controls the opening degree of each of the valve devices 61, 62, 63, the rotation speed of the air compressor 33, and other parameters and causes the fuel cell 20 to generate power. The driving control ECU calculates a required amount of power generation by the fuel cell 20 based on factors such as a degree of stepping on an accelerator device, the rotation speed of the traction motor, an amount of power required by each accessory included in the fuel cell system 10, and an amount of power required by an air conditioner installed in the vehicle.

Power generation implemented by supplying air and hydrogen gas to the fuel cell 20 at the flow rates calculated based on the required amount of power generation as described above is herein referred to as "normal power generation". In the present embodiment, power generation modes of the fuel cell 20 includes a fail-safe power generation (described later), in addition to the normal power generation. The control unit 96 causes the fuel cell 20 to generate power in any of these power generation modes. In the fail-safe power generation, a predetermined upper limit value is set for the required amount of power generation (required amount of electric current), and supply flow rates of air and hydrogen gas to the fuel cell 20 are calculated such that the power generation by the fuel cell 20 does not exceed the upper limit value. The control unit 96 controls the opening degree of each of the valve devices 61, 62, 63, the rotation speed of the air compressor 33, and other parameters to achieve such supply flow rates. In the present embodiment, the above "upper limit value" is 50%. It should be noted that the upper limit value may not necessarily be 50%, and any value smaller than 100% may be set as the upper limit value.

A2. Power Generation Control Process

Figure 2:
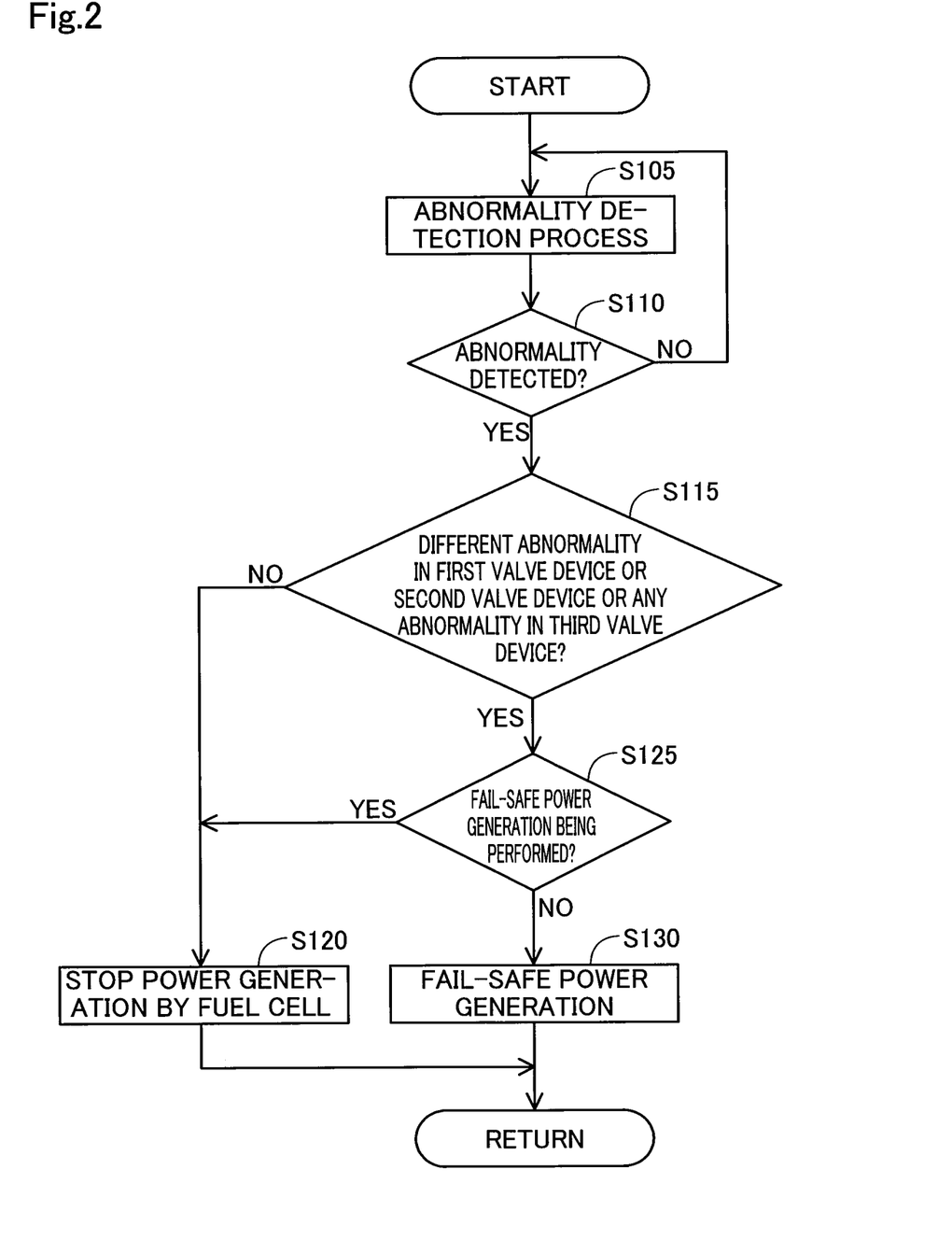
FIG. 2 is a flowchart of a general procedure of a power generation control process executed in the fuel cell system.

FIG. 2 is a flowchart of a general procedure of a power generation control process executed in the fuel cell system 10. The power generation control process refers to a process of controlling the mode of power generation by the fuel cell 20. When an ignition switch of the vehicle is turned on and the fuel cell system 10 starts operating, the control unit 96 causes the fuel cell 20 to perform the normal power generation. The power generation control process is executed in conjunction with the start of this normal power generation.

Referring to FIG. 2, an overview of the power generation control process will be first described. At step S105, the abnormality detection unit 95 performs an abnormality detection process for each of the valve devices 61, 62, 63. At step S110, the abnormality detection unit 95 determines whether an abnormality has been detected. As will be described later, the power generation control process is iteratively executed, and abnormalities to be detected at step S110 include not only an abnormality detected for the first time in any of the valve devices 61, 62, 63 that have had no abnormalities, but also an abnormality that has occurred in any of two valve devices while the other one of the valve devices continues having an abnormality that was detected at the last or previous execution of step S105. If the abnormality detection unit 95 determines that no abnormality has been detected (step S110: NO), the process returns to step S105 described above.

If the abnormality detection unit 95 determines that an abnormality has been detected (step S110: YES), the abnormality detection unit 95 determines at step S115 whether the detected abnormality is any one of an abnormality in the first valve device 61 that is different from the valve opening abnormality (hereinafter may be simply referred to as a "different abnormality"), the different abnormality in the second valve device 62, and any abnormality in the third valve device 63. "Any abnormality" as referred to above refers to the valve opening abnormality and any other kind of abnormalities including an abnormality where the valve can be opened but with a smaller or larger change in the opening degree than expected, an abnormality where the valve cannot be closed at all, and an abnormality where the valve can be closed but with a smaller or larger change in the opening degree than expected.

If the abnormality detection unit 95 determines that the detected abnormality is neither the different abnormality in the first valve device 61 nor the different abnormality in the second valve device 62 nor any abnormality in the third valve device 63 (step S115: NO), the control unit 96 stops power generation by the fuel cell 20 at step S120. Specifically, the control unit 96 stops the operation of the air compressor 33 to stop the supply of air to the fuel cell 20 and also stops the operation of the injector 75 and the hydrogen pump 84 to stop the supply of hydrogen gas to the fuel cell 20. In the present embodiment, determining that "the detected abnormality is neither the different abnormality in the first valve device 61 nor the different abnormality in the second valve device 62 nor any abnormality in the third valve device 63" means that the valve opening abnormality is occurring in the first valve device 61 or the second valve device 62. Under the situation where the valve opening abnormality is occurring in the first valve device 61, air cannot be supplied to the fuel cell 20 any more and thus the fuel cell 20 cannot continue power generation. Hence, in this case, the fuel cell 20 is stopped from generating power. This prevents excessive pressure increase inside the oxidation gas supply channel 31, which in turn prevents accidents such as damages to pipes constituting the oxidation gas supply channel 31. Additionally, the excessive pressure increase inside the oxidation gas supply channel 31 may be accompanied by excessive increase in load on the air compressor 33, which may damage components of the air compressor 33. For example, in the case where the air compressor 33 is a turbo compressor, a surge event may occur and cause damages to components such as an impeller and a motor. Stopping the power generation by the fuel cell 20 can also avoid wasteful supply of air from the air compressor 33, helping reduce power consumption required for the air supply to the fuel cell 20. Under the situation where the valve opening abnormality is occurring in the second valve device 62, cathode off-gas cannot be discharged from the fuel cell 20. This may result in excessive pressure increase on the cathode side of each single cell 21 due to inability to discharge the oxidation off-gas, which may cause damages to the fuel cell 20 such as buckling of the electrolyte membrane, a catalyst layer, or the like from the cathode side to the anode side. In the present embodiment, however, the power generation by the fuel cell 20 is stopped under such situations, which prevents damages to components of the fuel cell 20. Once the power generation by the fuel cell 20 is stopped, the driving control ECU may, for example, switch the driving mode of the vehicle into a so-called electric vehicle (EV) mode, in which the secondary battery 90 supplies power to the traction motor.

If, at step S115 described above, the abnormality detection unit 95 determines that the detected abnormality is any one of the different abnormality in the first valve device 61, the different abnormality in the second valve device 62, and any abnormality in the third valve device 63 (step S115: YES), the control unit 96 determines at step S125 whether the fuel cell 20 is currently performing the fail-safe power generation.

If the control unit 96 determines that the fuel cell 20 is not currently performing the fail-safe power generation (step S125: NO), the control unit 96 causes the fuel cell 20 to initiate the fail-safe power generation at step S130. If the different abnormality other than the valve opening abnormality occurs in the first valve device 61, the control unit 96 may be unable to accurately control the flow rate of air supplied to the fuel cell 20. Specifically, the flow rate of air supplied to the fuel cell 20 can also be adjusted by adjusting the rotation speed of the air compressor 33 and the opening degree (flow split ratio) of the third valve device 63. Nevertheless, an excessive or deficient flow rate of air supplied to the fuel cell 20 may still occur unless the opening degree of the first valve device 61 is within a predetermined threshold range. Thus, in such cases, the fuel cell 20 is caused to initiate the fail-safe power generation to prevent an excess or deficiency in oxidation gas in each single cell 21. Also, if the different abnormality other than the valve opening abnormality occurs in the second valve device 62, the control unit 96 may be unable to accurately control the flow rate of oxidation off-gas discharged from the fuel cell 20. Specifically, the flow rate of discharged oxidation off-gas can also be adjusted by adjusting the flow rate of air supplied to the fuel cell 20. Nevertheless, an excessive or deficient flow rate of discharged oxidation off-gas may still occur unless the opening degree of the second valve device 62 is within a predetermined threshold range. Thus, in such cases, the fuel cell system 10 of the present embodiment causes the fuel cell 20 to initiate the fail-safe power generation to prevent an excess or deficiency in the flow rate of discharged oxidation off-gas. Also, if any abnormality occurs in the third valve device 63, the control unit 96 may be unable to accurately control the flow rate of air supplied to the fuel cell 20 or the flow rate of oxidation off-gas discharged from the fuel cell 20. For example, in a configuration in which the air compressor 33 is actuated to supply compressed air at a faster flow rate than a required flow rate and the third valve device 63 is actuated to allow the compressed air in the amount corresponding to the difference from the required flow rate to flow into the bypass channel 51 to thereby compensate for a response delay of the air compressor 33, any abnormality in the third valve device 63 may result in a failure to compensate for such response delay of the air compressor 33 and a resultant excess or deficiency in the amount of oxidation gas supplied to the fuel cell 20. Such an excess or deficiency in the amount of oxidation gas supplied to the fuel cell 20 may be accompanied by an excess or deficiency in the flow rate of oxidation off-gas discharged from the fuel cell 20. Additionally, in the fuel cell system 10, hydrogen gas contained in the anode off-gas discharged into the anode off-gas discharge channel 81 is diluted by the oxidation gas flowing through the bypass channel 51 before the hydrogen gas is discharged to the outside. Thus, any abnormality in the third valve device 63 may reduce the flow rate of oxidation gas flowing through the bypass channel 51 and inhibit the above dilution from taking place properly. As such, the fuel cell system 10 of the present embodiment causes the fuel cell 20 to initiate the fail-safe power generation in the event of any abnormality being detected in the third valve device 63 in order to prevent any excess or deficiency in the flow rate of oxidation gas supplied to the fuel cell 20, prevent any excess or deficiency in the flow rate of oxidation off-gas discharged, and ensure proper dilution of hydrogen gas discharged from the fuel cell 20.

If, at step S125 described above, the control unit 96 determines that the fuel cell 20 is currently performing the fail-safe power generation (step S125: YES), step S120 described above is executed, stopping the power generation by the fuel cell 20. The power generation is stopped if an additional abnormality that is any one of the different abnormality in the first valve device 61, the different abnormality in the second valve device 62, and any abnormality in the third valve device 63 occurs while the fail-safe power generation is being performed, i.e., while any one of the different abnormality in the first valve device 61, the different abnormality in the second valve device 62, and any abnormality in the third valve device 63 is already occurring. Thus, in the present embodiment, the fail-safe power generation takes place (step S130 is executed) only when any one of the different abnormality in the first valve device 61, the different abnormality in the second valve device 62, and any abnormality in the third valve device 63 is occurring and the others of the valve devices 61, 62, 63 are having no abnormalities.

As described above, in the present embodiment, the fail-safe power generation takes place when any one of the different abnormality in the first valve device 61, the different abnormality in the second valve device 62, and any abnormality in the third valve device 63 is occurring. In such situations, if an additional abnormality that is any one of the different abnormality in the first valve device 61, the different abnormality in the second valve device 62, and any abnormality in the third valve device 63 occurs, i.e., if multiple abnormalities occur, components of the oxidation gas supply channel 31, such as pipes, or components of the fuel cell 20 may be damaged similarly to when the valve opening abnormality occurs in the first valve device 61 or the second valve device 62. Components of the bypass channel 51 may also be damaged. Additionally, such multiple occurrences of abnormalities may also cause wasteful air supply by the air compressor 33. Specifically, for example if an additional abnormality occurs in the second valve device 62 that causes its valve to open slower than expected while another abnormality is already occurring in the first valve device 61 that causes its valve to close slower than expected, air would be excessively supplied into the fuel cell 20 and the discharge of oxidation off-gas would be disrupted. This makes the cathode-side pressure excessively larger than the anode-side pressure in each single cell 21 and thus may cause damages such as buckling of the electrolyte membrane. Additionally, due to the excessive air supply, the electrolyte membrane in each single cell 21 may get excessively dry and damaged. Also, for example if the valve opening abnormality additionally occurs in the third valve device 63 while another abnormality is already occurring in the first valve device 61 that causes its valve to open slower than expected, pressure inside the oxidation gas supply channel 31 and the bypass channel 51 would excessively rise and possibly cause damages to the components constituting these channels 31, 51, such as pipes. In this case, the flow rate of air supplied to each single cell 21 would also significantly decrease, resulting in a so-called air shortage situation and possibly damaging the electrolyte membrane. Also, for example if the valve opening abnormality additionally occurs in the third valve device 63 while another abnormality is already occurring in the second valve device 62 that causes its valve to open slower than expected, pressure inside the fuel cell 20 would excessively rise and possibly cause damages to the components of the fuel cell 20, such as buckling of the electrolyte membrane. Hence, in such cases, the fuel cell system 10 of the present embodiment stops the power generation by the fuel cell 20, similarly to when the valve opening abnormality occurs in the first valve device 61 or the second valve device 62.

After execution of step S120 or step S130 described above, the process returns to step S105. The aforementioned power generation control process is implemented as a process flow for each of the valve devices 61, 62, 63. That is, the control unit 96 executes the power generation control process for each of the valve devices 61, 62, 63. Further details will be given below with reference to FIGS. 3 and 4.

Figure 3:
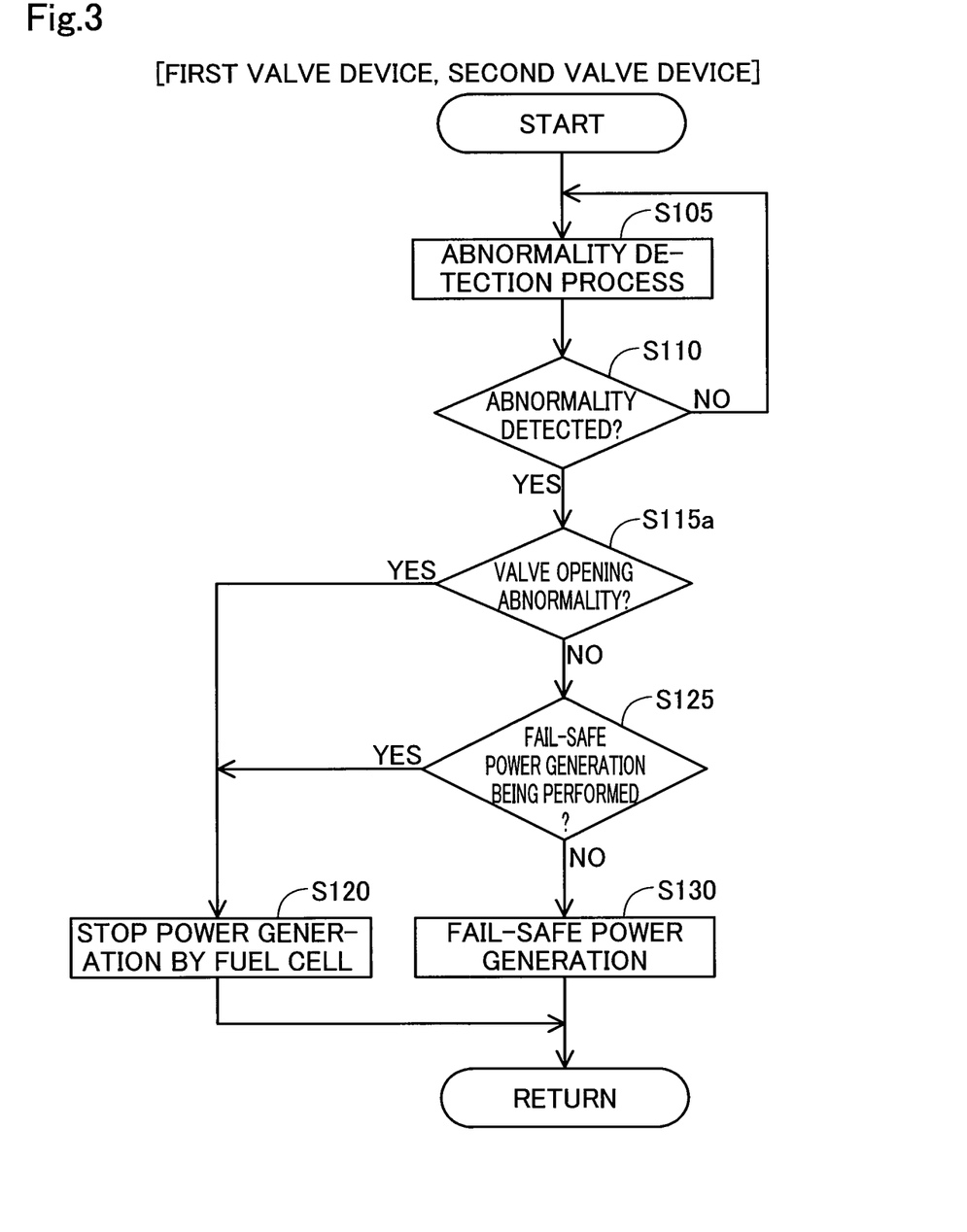
FIG. 3 is a flowchart of a procedure of the power generation control process executed for each of a first valve device and a second valve device.

FIG. 3 is a flowchart of a procedure of the power generation control process executed for each of the first valve device 61 and the second valve device 62. The power generation control process is executed with the same procedure for the first valve device 61 and the second valve device 62. Steps S105 and S110 are the same as steps S105 and S110 described above. That is, the abnormality detection process is executed for each of the valve devices 61, 62 (step S105) to determine whether an abnormality has been detected (step S110). If it is determined at step S110 that an abnormality has been detected (step S110: YES), the control unit 96 determines whether the detected abnormality is the valve opening abnormality (step S115*a*).

If the control unit 96 determines that the detected abnormality is the valve opening abnormality (step S115*a*: YES), step S120 described above is executed, stopping the power generation by the fuel cell 20. Thus, if the valve opening abnormality occurs in the first valve device 61 or the second valve device 62 during the normal operation, the power generation by the fuel cell 20 is stopped. Likewise, if the valve opening abnormality occurs in the first valve device 61 or the second valve device 62 during the fail-safe power generation, the power generation by the fuel cell 20 is also stopped. If the control unit 96 determines at step S115*a* that the detected abnormality is not the valve opening abnormality (step S115*a*: NO), step S125 described above is executed.

Figure 4:
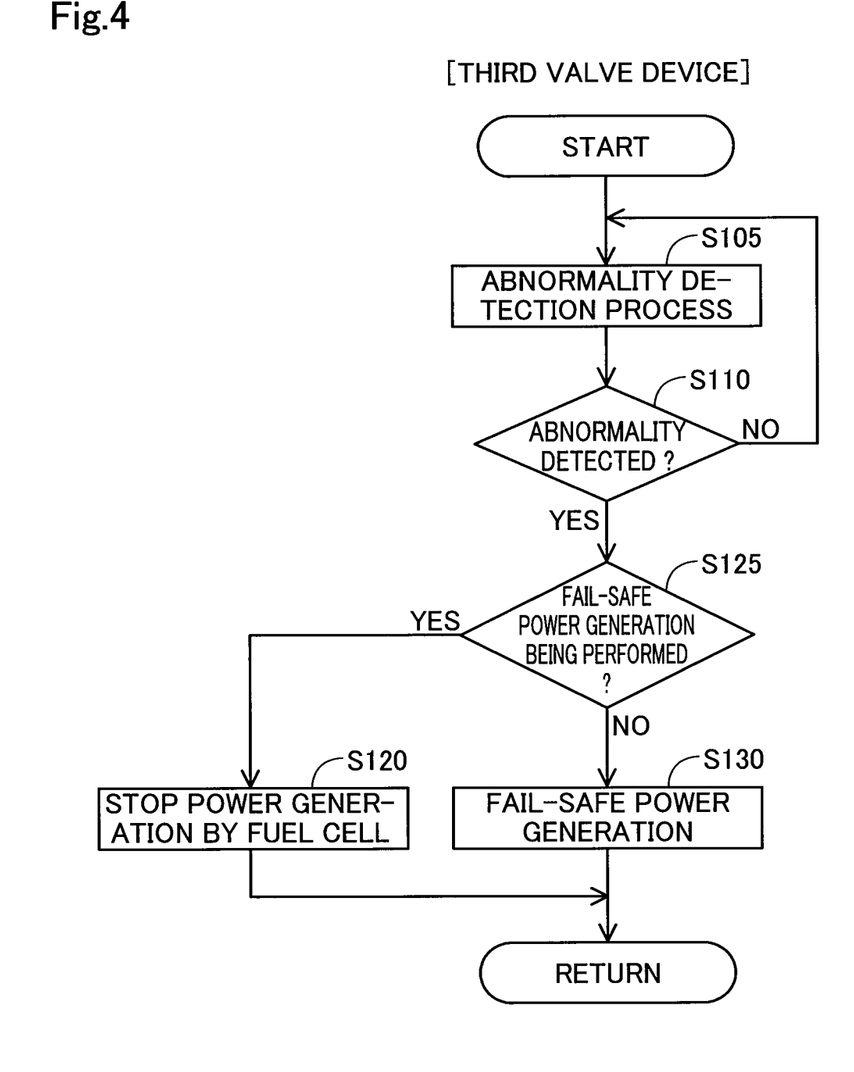
FIG. 4 is a flowchart of a procedure of the power generation control process executed for a third valve device.

FIG. 4 is a flowchart of a procedure of the power generation control process executed for the third valve device 63. The procedure of the power generation control process for the third valve device 63 is similar to the procedure shown in FIG. 2 except that step S115 is omitted. That is, if an abnormality is detected in the third valve device 63 (step S110: YES), step S125 is executed regardless of whether the detected abnormality is the valve opening abnormality, and it is determined whether the fail-safe power generation is being performed. If the fail-safe power generation is not being performed, the fail-safe power generation is initiated regardless of the kind of abnormality. This is because an abnormality in the third valve device 63 alone is not a critical one and does not require stoppage of the power generation by the fuel cell 20. With respect of the supply of air, having an abnormality that is "not a critical one" means that, even with such an abnormality, both of the required flow rate of air supplied to the fuel cell 20 and the required flow rate of oxidation off-gas discharged from the fuel cell 20 can be achieved within predetermined flow rate ranges by adjusting the rotation speed of the air compressor 33 and the opening degree of the first valve device 61.

If (i) the different abnormality from the valve opening abnormality is detected in the first valve device 61, (ii) the different abnormality is detected in the second valve device 62, or (iii) any abnormality is detected in the third valve device 63, the fuel cell system 10 of the present embodiment described above causes the fuel cell 20 to initiate the fail-safe power generation, in which a limitation is provided on the electric current output from the fuel cell 20. This increases the possibility of continuing the power generation. Also, during the fail-safe power generation, if any abnormality is additionally detected in one of the two valve devices different from the other valve device in which an abnormality has already been detected, i.e., if multiple abnormalities occur, the fuel cell 20 is stopped from generating power. This prevents excessive pressure increase inside the oxidation gas supply channel 31 or the bypass channel 51 that may otherwise occur if the power generation is continued. This, in turn, prevents damages to the components of the oxidation gas supply channel 31 or the bypass channel 51, such as pipes, and damages to the fuel cell 20 itself (each single cell 21 itself) that may otherwise be caused by an excess or deficiency in supplied oxidation gas.

If the valve opening abnormality is detected in either the first valve device 61 or the second valve device 62 while no abnormality is detected in the third valve device 63, i.e., during the normal power generation, the fuel cell 20 is stopped from generating power. This avoids situations where the supply of oxidation gas to the fuel cell 20 continues despite where the oxidation gas cannot be supplied to the fuel cell 20 or the oxidation off-gas cannot be discharged from the fuel cell 20. This, in turn, prevents excessive pressure increase inside the oxidation gas supply channel 31 or the fuel cell 20, preventing damages to the components of the oxidation gas supply channel 31, such as pipes, or damages to the components of the fuel cell 20, such as the electrolyte membrane. Wasteful supply of the oxidation gas can also be avoided, which reduces power consumption required for the oxidation gas supply, for example power consumption by the air compressor 33.

B. Alternative Embodiments (B1) The above embodiment may be modified such that, similarly to the power generation control process for the third valve device 63 shown in FIG. 4, the fail-safe power generation is initiated upon detection of any abnormality in either the first valve device 61 or the second valve device 62 regardless of whether the abnormality is the valve opening abnormality, and the power generation by the fuel cell 20 is stopped upon detection of any abnormality during the fail-safe power generation. This configuration also prevents damages to the components of the oxidation gas supply channel 31, the bypass channel 51, or the fuel cell 20 and reduces power consumption through reduction of wasteful air supply, as compared to configurations where the normal power generation is continued despite an abnormality occurring in the first valve device 61 and the second valve device 62.

(B2) In the abnormality detection process at step S105, the abnormality detection unit 95 may transmit special opening degree commands to each of the valve devices 61, 62, 63 that are intended to identify an abnormality therein. For example, the abnormality detection unit 95 may sequentially transmit a plurality of commands such that the opening degree gradually increases. Conversely, the abnormality detection unit 95 may sequentially transmit a plurality of commands such that the opening degree gradually reduces. This configuration ensures more accurate detection of an abnormality in each of the valve devices 61, 62, 63.

(B3) In each embodiment, some of the components embodied as hardware may be replaced with software. Conversely, some of the components embodied as software may be replaced with hardware. For example, at least one functional unit of the abnormality detection unit 95 and the control unit 96 may be embodied as a module composed of an integrated circuit, a discrete circuit, or a combination thereof. When some or all of the functions of the present disclosure are embodied as software, the software (computer programs) may be stored in a computer-readable recording medium and provided in the form of the computer-readable recording medium. The "computer-readable recording medium" is not limited to a portable recording medium such as a flexible disk or a CD-ROM and includes various internal storage devices in a computer such as a RAM and a ROM and external storage devices fixed to the computer such as a hard disk. In other words, the "computer-readable recording medium" may be broadly interpreted as encompassing any type of recording media capable of storing data packets in a non-transitory manner.

The present disclosure is not limited to the above embodiments and may be implemented in various different ways without departing from the scope of the disclosure. Any of the technical features, unless being described as essential herein, may be omitted as appropriate. For example, the present disclosure may be implemented in the following aspects.

(1) An aspect of the present disclosure is a fuel cell system. The fuel cell system includes: a fuel cell; an oxidation gas supply channel for supplying oxidation gas to the fuel cell; an oxidation off-gas discharge channel for discharging oxidation off-gas from the fuel cell; a bypass channel configured to connect the oxidation gas supply channel and the oxidation off-gas discharge channel; a first valve device provided at the oxidation gas supply channel and configured to adjust a flow rate of the oxidation gas supplied to the fuel cell; a second valve device provided at the oxidation off-gas discharge channel and configured to adjust a flow rate of the oxidation off-gas discharged from the fuel cell; a third valve device provided at the bypass channel and configured to adjust a flow rate of the oxidation gas flowing through the bypass channel; an abnormality detection unit configured to detect an abnormality in the first valve device, the second valve device, and the third valve device; and a control unit configured to control power generation by the fuel cell. If (i) a different abnormality from a valve opening abnormality is detected in the first valve device, the valve opening abnormality being an abnormality where a valve is stuck at a minimum opening degree, (ii) the different abnormality is detected in the second valve device, or (iii) any abnormality is detected in the third valve device, the control unit causes the fuel cell to initiate fail-safe power generation in which a limitation is provided on an electric current output from the fuel cell, and, during the fail-safe power generation, if, among the first valve device, the second valve device, and the third valve device, any abnormality is additionally detected in one of two valve devices different from the other valve device in which an abnormality is already detected, the control unit stops power generation by the fuel cell.

According to this aspect, if (i) the different abnormality from the valve opening abnormality is detected in the first valve device, (ii) the different abnormality is detected in the second valve device, or (iii) any abnormality is detected in the third valve device, the fuel cell system causes the fuel cell to initiate fail-safe power generation in which a limitation is provided on an electric current output from the fuel cell. This increases the possibility of continuing the power generation. Also, during the fail-safe power generation, if any abnormality is additionally detected in one of the two valve devices different from the other valve device in which an abnormality has already been detected, i.e., if multiple abnormalities occur, the power generation by the fuel cell is stopped. This provides the following advantageous effects. Specifically, the power generation by the fuel cell is stopped if the different abnormality is detected in the first valve device and any abnormality is additionally detected in the second valve device or if the different abnormality is detected in the second valve device and any abnormality is additionally detected in the first valve device. This prevents situations where the flow rate of oxidation gas supplied to the fuel cell cannot be accurately controlled and thus damages to the fuel cell itself are incurred due to an excess or deficiency in the flow rate of oxidation gas supplied thereto. Moreover, the power generation by the fuel cell is stopped if the different abnormality is detected in the first valve device or the second valve device and any abnormality is additionally detected in the third valve device or if any abnormality is detected in the third valve device and any abnormality is additionally detected in the first valve device or the second valve device. This prevents excessive pressure increase inside the oxidation gas supply channel and the bypass channel or inside the fuel cell, preventing damages to the components of these channels, such as pipes, or the fuel cell itself.

(2) In the fuel cell system of the above aspect, the control unit may stop the power generation by the fuel cell if the valve opening abnormality is detected in either the first valve device or the second valve device while no abnormality is detected in the third valve device.

According to this aspect, the fuel cell system stops the power generation by the fuel cell if the valve opening abnormality is detected in either the first valve device or the second valve device while no abnormality is detected in the third valve device. This avoids situations where the supply of oxidation gas to the fuel cell continues despite where no or only a little oxidation gas can be supplied to the fuel cell or despite where no or only a little oxidation off-gas can be discharged from the fuel cell. This, in turn, prevents excessive pressure increase inside the oxidation gas supply channel or the fuel cell, preventing damages to the components of the oxidation gas supply channel, such as pipes, or damages to the components of the fuel cell. Wasteful supply of the oxidation gas can also be avoided, which reduces power consumption required for the oxidation gas supply.

What is claimed is:

1. A fuel cell system comprising:
   a fuel cell;
   an oxidation gas supply channel configured to supply oxidation gas to the fuel cell;
   an oxidation off-gas discharge channel configured to discharge oxidation off-gas from the fuel cell;
   a bypass channel configured to connect the oxidation gas supply channel and the oxidation off-gas discharge channel;
   a first valve device provided at the oxidation gas supply channel and configured to adjust a flow rate of the oxidation gas supplied to the fuel cell;
   a second valve device provided at the oxidation off-gas discharge channel and configured to adjust a flow rate of the oxidation off-gas discharged from the fuel cell;
   a third valve device provided at the bypass channel and configured to adjust a flow rate of the oxidation gas flowing through the bypass channel; and
   a control device for controlling power generation by the fuel cell, the control device including:
   a memory storing program instructions; and
   a processor configured to execute the program instructions to:
   detect a first abnormality in the first valve device, the second valve device, and the third valve device;
   if (i) a different abnormality from a valve opening abnormality is detected in the first valve device, the valve opening abnormality being an abnormality where a valve is stuck at a minimum opening degree, (ii) the different abnormality is detected in the second valve device, or (iii) any abnormality is detected in the third valve device, cause the fuel cell to initiate fail-safe power generation in which a limitation is provided on an electric current output from the fuel cell; and
   during the fail-safe power generation, if, among the first valve device, the second valve device, and the third valve device, any abnormality is additionally detected in a valve device different from a valve device in which the first abnormality is already detected, stop power generation by the fuel cell.

2. The fuel cell system according to claim 1, wherein the processor is further configured to execute a program instruction to stop power generation by the fuel cell if the valve opening abnormality is detected in either the first valve device or the second valve device while no abnormality is detected in the third valve device.

3. The fuel cell system according to claim 1, further comprising a plurality of opening degree detection sensors configured to detect respective opening degrees of the first valve device, the second valve device and the third valve device, wherein
   the first valve device, the second valve device and the third valve device each has a drive motor, and
   the processor is further configured to execute a program instruction to detect the first abnormality in the first valve device, the second valve device and the third valve device by comparing a drive command transmitted to each of the drive motors for driving a respective valve device and an opening degree detected by each of the opening degree detection sensors.

4. The fuel cell system according to claim 3, wherein the drive command includes at least one of a plurality of commands sequentially transmitted such that the opening degree gradually increases and a plurality of commands sequentially transmitted such that the opening degree gradually reduces.

* * * * *